(12) United States Patent
Seto et al.

(10) Patent No.: US 10,890,500 B2
(45) Date of Patent: *Jan. 12, 2021

(54) PRESSURE SENSOR (71) Applicant: Azbil Corporation, Chiyoda-ku (JP)

(72) Inventors: Yuki Seto, Chiyoda-ku (JP); Rina Ogasawara, Chiyoda-ku (JP)

(73) Assignee: Azbil Corporation, Chiyoda-ku (JP)

( * ) Notice: Subject to any disclaimer, the term of this patent is extended or adjusted under 35 U.S.C. 154(b) by 146 days.

This patent is subject to a terminal disclaimer.

(21) Appl. No.: 16/069,714

(22) PCT Filed: Dec. 16, 2016

(86) PCT No.: PCT/JP2016/087556
§ 371 (c)(1),
(2) Date: Jul. 12, 2018

(87) PCT Pub. No.: WO2017/122496
PCT Pub. Date: Jul. 20, 2017

(65) Prior Publication Data
US 2019/0025144 A1 Jan. 24, 2019

(30) Foreign Application Priority Data

Jan. 14, 2016 (JP) .................... 2016-005029

(51) Int. Cl.
*G01L 9/00* (2006.01)
*G01L 19/14* (2006.01)
*G01L 13/02* (2006.01)

(52) U.S. Cl.
CPC ............ *G01L 9/0055* (2013.01); *G01L 9/006* (2013.01); *G01L 9/0042* (2013.01); *G01L 13/025* (2013.01); *G01L 19/147* (2013.01)

(58) Field of Classification Search
CPC ..... G01L 9/0055; G01L 9/0054; G01L 9/006; G01L 9/0042; G01L 13/025;
(Continued)

(56) References Cited

U.S. PATENT DOCUMENTS 5,872,315 A 2/1999 Nagase et al.
2007/0277616 A1* 12/2007 Nikkel .................. G01L 9/0052
73/715

(Continued)

FOREIGN PATENT DOCUMENTS

JP 63-217671 A 9/1988
JP 9-232595 A 9/1997
(Continued)

OTHER PUBLICATIONS

International Search Report dated Mar. 7, 2017 in PCT/JP2016/087556 filed Dec. 16, 2016.

*Primary Examiner* — Suman K Nath
(74) *Attorney, Agent, or Firm* — Oblon, McClelland, Maier & Neustadt, L.L.P.

(57) ABSTRACT

A pressure sensor (100) includes a diaphragm (3); a semiconductor chip (1) that includes a plurality of resistors (R1 to R4) constituting a strain gauge and that has a square shape in plan view; four first structures (2a to 2d) each having one end joined to a region of the second main surface of the diaphragm that is deformed when a pressure is applied to a first main surface (1A) of the diaphragm and having other ends respectively connected to four corners of the semiconductor chip, the first structures extend downward to a second main surface (3B); and a second structure (2e) having one end joined to a center (30) of the diaphragm on the second main surface in plan view and having the other end joined (Continued)

to a center (10) of the semiconductor chip in plan view, the second structure extending downward to the second main surface.

5 Claims, 11 Drawing Sheets

(58) Field of Classification Search
CPC ..... G01L 19/147; G01L 7/082; G01L 1/2218; G01L 2009/0069; G01L 17/00; G01L 19/00; G01P 15/0802
See application file for complete search history.

(56) References Cited

U.S. PATENT DOCUMENTS

| | | | |
|---|---|---|---|
| 2008/0098820 A1 | 5/2008 | Morsch et al. | |
| 2018/0136062 A1* | 5/2018 | Zheng | ................... G01L 9/0064 |

FOREIGN PATENT DOCUMENTS

| | | | |
|---|---|---|---|
| JP | 2001-272287 A | 10/2001 |
| JP | 2004-45140 A | 2/2004 |
| JP | 2008-527313 A | 7/2008 |
| JP | 2009-236666 A | 10/2009 |

\* cited by examiner

PRESSURE SENSOR

TECHNICAL FIELD

The present invention relates to a pressure sensor and relates, for example, to a sanitary pressure sensor.

BACKGROUND ART

In general, a sanitary pressure sensor for use in production sites and the like of food, medicine, and the like for which sanitary care is necessary is required to satisfy severe requirements relating to corrosion resistance, cleanliness, reliability, versatility, and the like.

For example, to satisfy requirements for corrosion resistance, it is necessary to use, for a liquid contact part of the sanitary pressure sensor with which a pressure-measurement object fluid (for example, a liquid) comes into contact, a material, for example, stainless steel (SUS), ceramics, titanium, or the like, having high corrosion resistance. In addition, to satisfy requirements for cleanliness, the sanitary pressure sensor is required to have an easily cleanable flush diaphragm structure and to have high thermal shock resistance with respect to steam cleaning. In addition, to satisfy requirements for reliability, the sanitary pressure sensor is required to have a structure (oil-free structure) in which a filling agent is not used and a structure (barrier high rigidity) in which a diaphragm is not easily broken. Moreover, to satisfy requirements for versatility, a part of the sanitary pressure sensor connected to a pipe in which a measurement object fluid flows is required to have a joint shape.

Accordingly, materials and structures to be used for the sanitary pressure sensor are limited compared with other pressure sensors, and thus, it is not easy to increase the sensitivity of the sanitary pressure sensor. For example, when the membrane thickness of the diaphragm is increased (the aspect ratio of the diameter to the thickness of the diaphragm is decreased) to achieve the structure in which the diaphragm is not easily broken, the deformation amount of the diaphragm becomes minor, and there is a problem of decrease in sensor sensitivity. Therefore, a technology for precisely detecting minor deformation of the diaphragm is required for the sanitary pressure sensor.

For example, in each of the load converting pressure sensors disclosed in PTLs 1 and 2, only the displacement of a center part of a diaphragm is transmitted to a semiconductor chip (beam member) of Si or the like in which a strain gauge that is configured by a diffusion resistor is formed, and a change in the resistance value of the diffusion resistor due to a piezoresistance effect based on the strain of the aforementioned semiconductor chip is detected to thereby attempt to increase the sensitivity of the sensor.

Specifically, in each of the conventional load converting pressure sensors disclosed in PTLs 1 and 2, a center part of the semiconductor chip that has an oblong shape in plan view is supported at a center part of the diaphragm, and the opposite ends of the aforementioned semiconductor chip are fixed at positions that are substantially unmoved. For example, in PTL 1, the center of the strip-shaped semiconductor chip is supported at the center of the diaphragm with a rod-shaped member, which is called a pivot, and the opposite ends of the semiconductor chip in the longitudinal direction are fixed via an insulating base to a thick part formed at the outer peripheral edge of the diaphragm. In addition, in PTL 2, the center of the rectangular semiconductor chip is fixed at the center of the diaphragm, and the opposite ends of the semiconductor chip in the longitudinal direction are fixed on an unmoved base.

CITATION LIST

Patent Literature

PTL 1: Japanese Unexamined Patent Application Publication No. 2004-45140
PTL 2: Japanese Unexamined Patent Application Publication No. 63-217671

SUMMARY OF INVENTION

Technical Problem

Meanwhile, generally, in a sanitary pressure sensor, a joint (for example, a ferrule joint) is employed for a part that is connected to a pipe in which a measurement object fluid flows.

Figure 17:
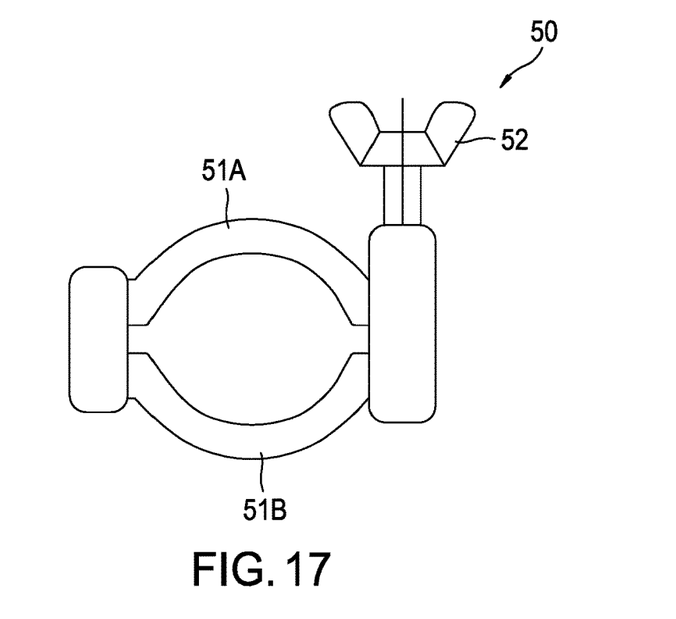
FIG. 17 illustrates a planar structure of the clamp that connects the pressure sensor and the pipe to each other.
Figure 18:
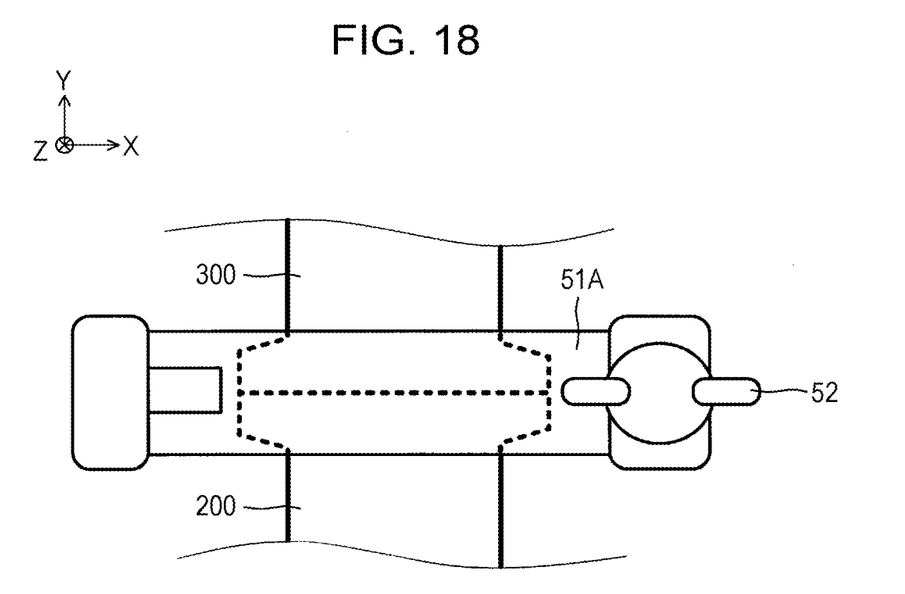
FIG. 18 illustrates a connection structure of the pressure sensor and the pipe with the clamp.

The connection between the pipe and the sanitary pressure sensor is achieved by using a connection member that is called a clamp such as that illustrated in FIG. 17. Specifically, as illustrated in FIG. 18, a joint of a pipe 200 and a joint of a sanitary pressure sensor 300 are disposed opposite each other. In addition, the two joints are placed between ring-shaped fixing portions 51A and 51B of a clamp 50. Further, the fixing portions 51A and 51B are fastened with a screw 52, and the pipe 200 and the sanitary pressure sensor 300 are thereby connected to each other.

However, when the pipe and the sanitary pressure sensor are connected to each other by using the clamp, a diaphragm of the sanitary pressure sensor is considerably deformed, and there is a risk that the zero point (offset) of a sensor output is shifted. In a case of a pressure sensor, such as those disclosed in the aforementioned PTLs 1 and 2, that has a semiconductor chip having an oblong shape in plan view, adjusting the zero point is not easy because the shift amount of the zero point as a result of fixing a clamp varies depending on the position of a screw with which the clamp is fastened.

The present invention is made in consideration of the aforementioned problem, and a purpose of the present invention is to suppress variation in the shift amount of the zero point of a sensor output when a pipe in which a measurement object fluid flows and a pressure sensor are connected to each other with a clamp.

Solution to Problem

A pressure sensor according to the present invention includes a diaphragm that has a first main surface that receives a pressure of a measurement object fluid and a second main surface opposite to the first main surface; a semiconductor chip that has one surface on which a plurality of resistors that constitute a strain gauge are formed, the semiconductor chip having a square shape in plan view; four first structures that each have one end joined in a region of the second main surface in which the diaphragm is deformed when a pressure larger than a pressure applied to the second main surface is applied to the first main surface and that have other ends respectively connected to four corners of an other surface of the semiconductor chip, the four first structures extending downward to the second main surface; and a second structure that has one end joined to a center of the diaphragm on the second main surface in plan view and that has an other end joined to a center of the other surface of the semiconductor chip in plan view, the second structure extending downward to the second main surface. The plurality of resistors are formed on a periphery of a circle that shares a center with the semiconductor chip in plan view. The plurality of resistors are formed on straight lines that connect the center of the semiconductor chip and middle points of respective sides of the semiconductor chip to each other in plan view.

Advantageous Effects of Invention

According to the description above, the present invention enables suppression of variation in the shift amount of the zero point of a sensor output when a pipe in which a measurement object fluid flows and a pressure sensor are connected to each other with a clamp.

DESCRIPTION OF EMBODIMENTS

First, an outline of a pressure sensor according to the present invention will be described.

A pressure sensor (100, 102) according to the present invention includes a diaphragm (3) that has a first main surface (3A) that receives a pressure of a measurement object fluid and a second main surface (3B) opposite to the first main surface; a semiconductor chip (1) that has one surface (1A) on which a plurality of resistors (R1 to R4) that constitute a strain gauge are formed, the semiconductor chip having a square shape in plan view; four first structures (2a to 2d) that each have one end joined in a region of the second main surface in which the diaphragm is deformed when a pressure larger than a pressure applied to the second main surface is applied to the first main surface and that have other ends respectively connected to four corners of an other surface (1B) of the semiconductor chip, the four first structures extending downward to the second main surface; and a second structure (2e) that is vertically provided on the second main surface, the second structure having one end joined to a center (30) of the diaphragm on the second main surface in plan view and having an other end joined to a center (10) of the other surface of the semiconductor chip in plan view. The plurality of resistors are formed on a periphery of a circle (11) that shares a center with the semiconductor chip in plan view. The plurality of resistors are formed on straight lines (13, 14) that connect the center of the semiconductor chip and middle points of respective sides of the semiconductor chip to each other in plan view.

In the aforementioned pressure sensor, the semiconductor chip may have a recessed portion (1C, 1E) formed in the aforementioned other surface (1B), and the plurality of resistors may be formed in a region of the aforementioned one surface of the semiconductor chip corresponding to an inside of the aforementioned recessed portion.

In the aforementioned pressure sensor, the recessed portion (1C) may have a circular shape in plan view.

In the aforementioned pressure sensor, the recessed portion (1E) may have a rectangular shape in plan view.

Note that, in the aforementioned description, reference signs in the drawings corresponding to constituent elements of the invention are mentioned, as examples, in parentheses.

Hereinafter, embodiments of the present invention will be described with reference to the drawings. Note that, in the following description, constituent elements common between the embodiments are given the same reference signs, and repeated description for these constituent elements will be omitted.

First Embodiment

Figure 1:
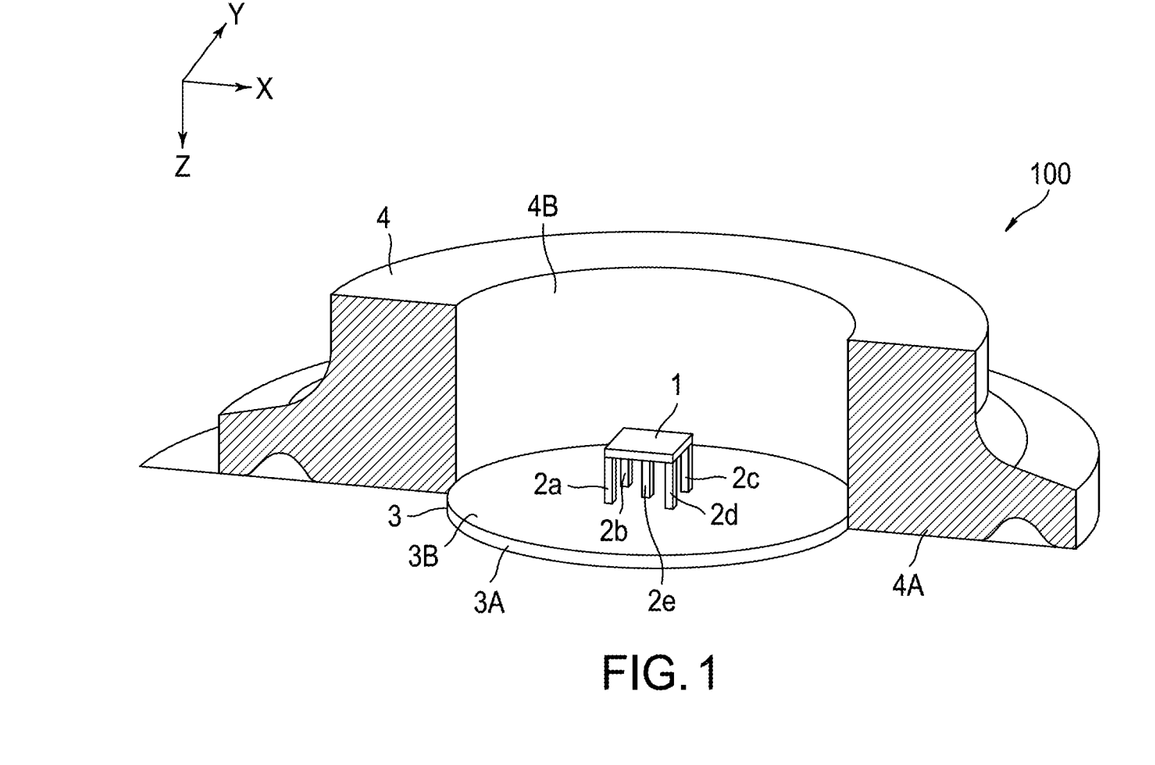
FIG. 1 is a perspective view illustrating a constitution of a pressure sensor according to a first embodiment.
Figure 2:
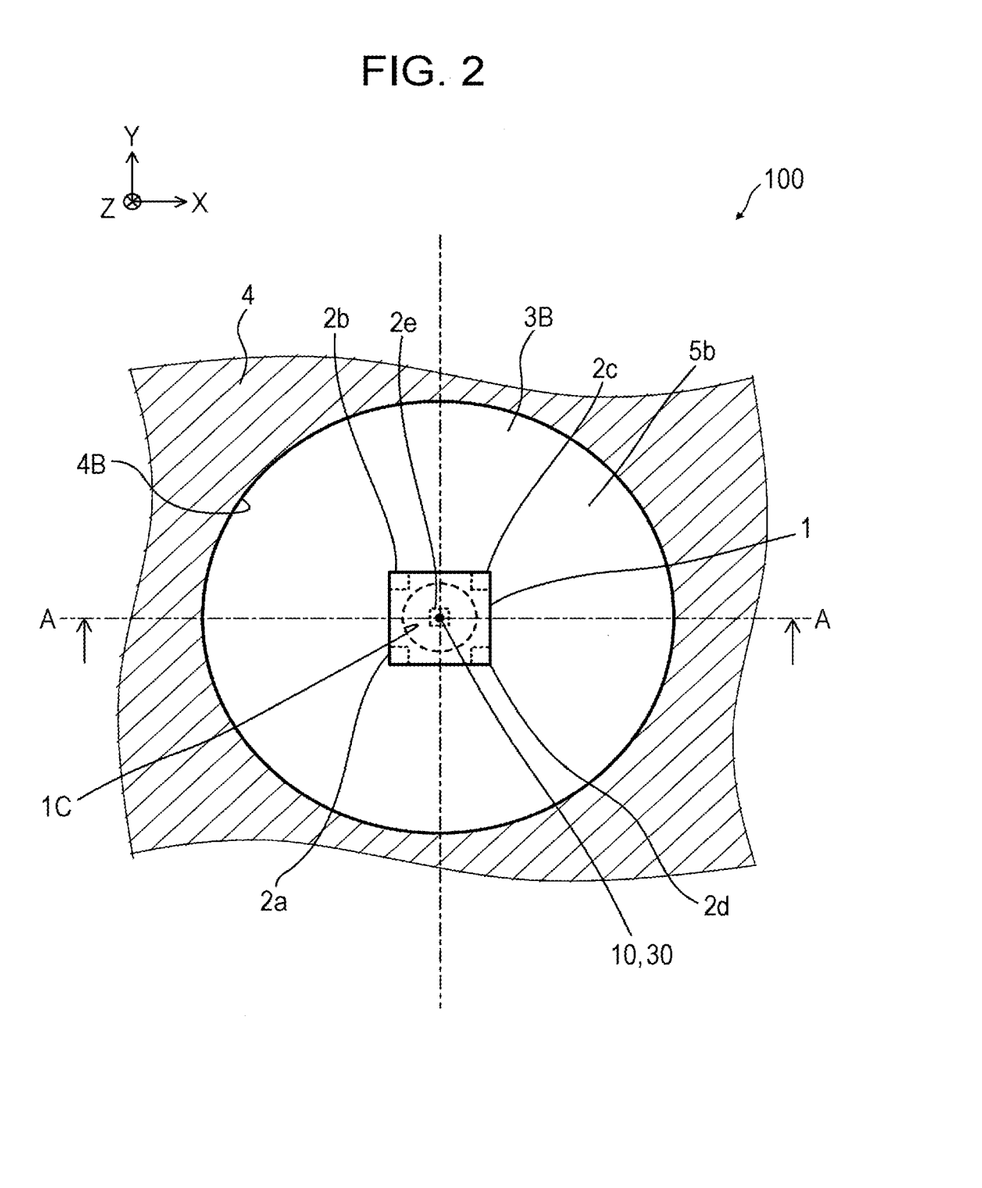
FIG. 2 is a plan view illustrating the constitution of the pressure sensor according to the first embodiment.
Figure 3:
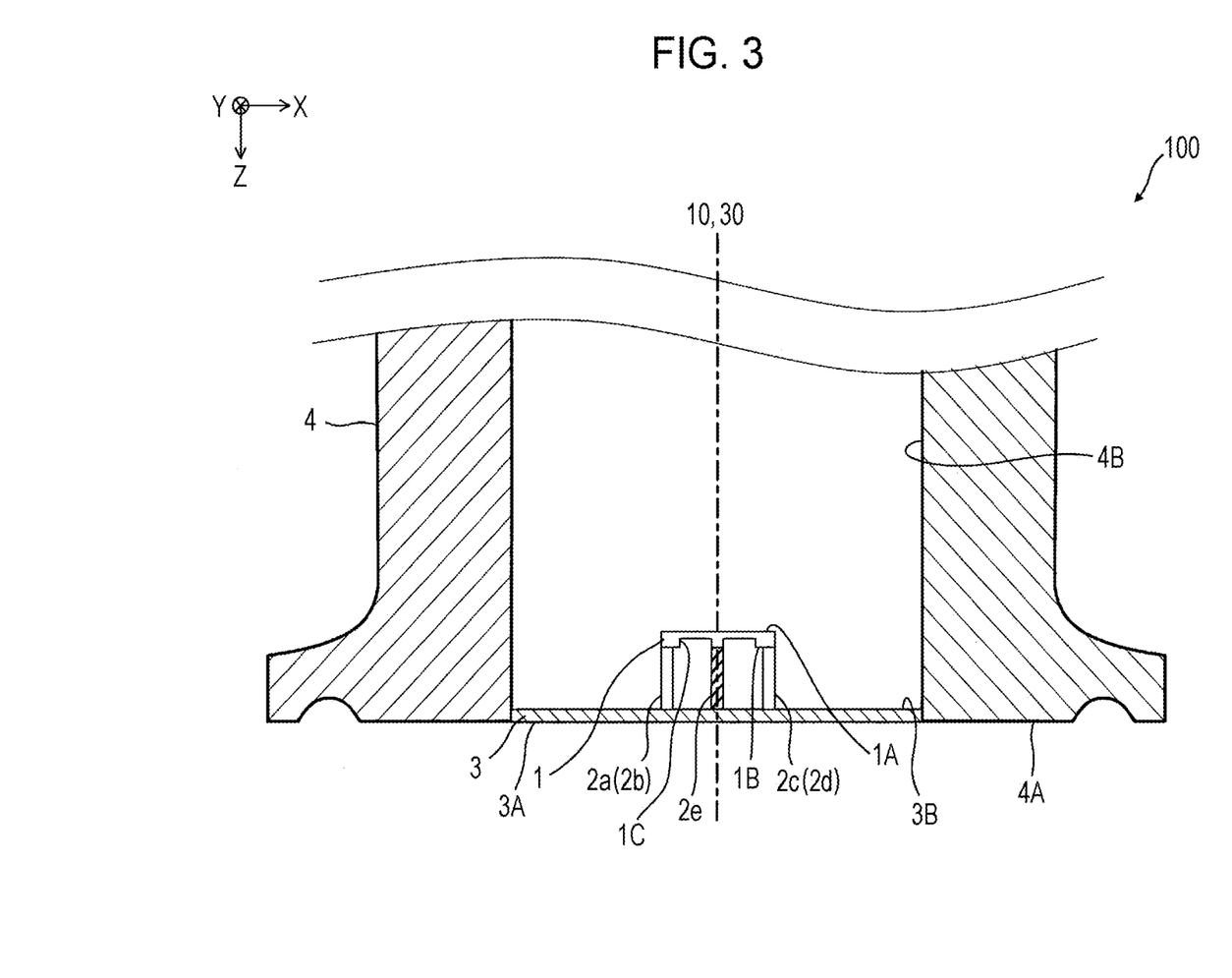
FIG. 3 is a sectional view illustrating the constitution of the pressure sensor according to the first embodiment.

FIGS. 1 to 3 illustrate a constitution of a pressure sensor according to a first embodiment.

FIG. 1 illustrates a perspective view of a pressure sensor 100 according to the first embodiment. FIG. 2 illustrates a planar structure of the pressure sensor 100 viewed in the Z direction in FIG. 1. FIG. 3 illustrates a sectional structure of the pressure sensor 100 in the A-A section in FIG. 2. Note that, in FIG. 1, a sectional structure of 180 degrees is illustrated for only a housing 4.

The pressure sensor 100 illustrated in FIGS. 1 to 3 is an apparatus that transmits a displacement of a diaphragm when the diaphragm is bent due to a pressure of a measurement object fluid and thereby detects the pressure of the aforementioned fluid.

Specifically, the pressure sensor 100 includes a semiconductor chip 1, support members 2a, 2b, 2c, 2d, and 2e, a diaphragm 3, and the housing 4. Note that, in FIGS. 1 to 3, a mechanism that transmits a bend of the diaphragm 3 of the pressure sensor 100 to the semiconductor chip 1 is illustrated and illustration of other functional parts, such as a circuit that processes a signal output from the semiconductor chip 1, is omitted. In addition, the pressure sensor 100 may additionally has a display part (for example, a liquid crystal display) and the like for presenting various information, such as a value of a detected pressure, to a user.

The semiconductor chip 1, the diaphragm 3, and the support members 2a to 2e are housed in the housing 4 that is configured by a metal material having high corrosion resistance. As illustrated in FIGS. 1 to 3, the housing 4 has a cylindrical shape. One end portion 4A of the housing 4 has a joint shape for connection to a pipe in which the measurement object fluid flows. The inner portion of the housing 4 is filled with, for example, air, and the pressure on an inner wall 4B side is, for example, an atmospheric pressure.

The diaphragm 3 is a membrane that receives a pressure of the measurement object fluid. The diaphragm 3 is constituted by, for example, a material such as stainless steel (SUS), ceramics, titanium, or the like having high corrosion resistance and has, for example, a circular shape in plan view. The diaphragm 3 supports the semiconductor chip 1 and the support members 2.

The diaphragm 3 is fixed to the end portion 4A side of the housing 4 and closes an opening part of the end portion 4A of the housing 4. For example, the diaphragm 3 is joined at the outer circumferential edge thereof to the inner wall 4B on the end portion 4A side of the housing 4 without a gap.

The diaphragm 3 has a pressure reception surface (liquid contact surface) 3A with which the measurement object fluid comes into contact and a support surface 3B that supports the semiconductor chip 1 and the support members 2, the support surface 3B being a surface opposite to the pressure reception surface 3A. The diaphragm 3 is bent when a pressure larger than a pressure (for example, an atmospheric pressure) applied to the support surface 3B is applied from the measurement object fluid to the pressure reception surface 3A.

The semiconductor chip 1 has a square shape in plan view and constituted by a semiconductor substrate of Si or the like. The semiconductor chip 1 has a main surface 1A on which the strain gauge that detects, as a change in a resistance value, a strain generated due to a stress of the semiconductor chip 1 is formed and a rear surface 1B to which the support members 2 are joined, the rear surface 1B being a surface opposite to the main surface 1A.

Figure 4:
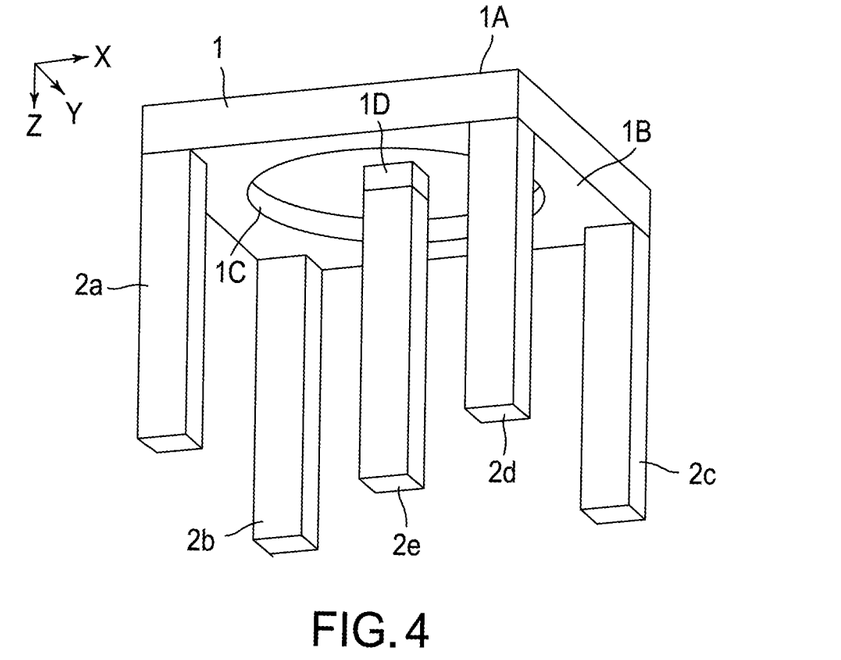
FIG. 4 is a perspective view on the rear surface side of a semiconductor chip in the pressure sensor according to the first embodiment.

FIG. 4 is a perspective view on the rear surface 1B side of the semiconductor chip 1.

As illustrated in FIG. 4, a recessed portion (counter bore) 1C is formed in the rear surface 1B of the semiconductor chip 1. As illustrated in FIGS. 2 to 4, the recessed portion 1C is a depression that is formed in a surface of the semiconductor chip 1 facing the diaphragm 3, that is, the rear surface 1B of the semiconductor chip 1 and that has a circular shape with a center 10 of the semiconductor chip 1 as the center point in plan view.

A base 1D for joining the semiconductor chip 1 and the support member 2e to each other is formed at, for example, the center of the recessed portion 1C having the circular shape in plan view, that is, at the center 10 of the semiconductor chip 1 on the rear surface 1B. The base 1D is formed, for example, integral with the semiconductor chip 1. A non-through hole that has a circular shape in plan view is formed by, for example, shaving the rear surface 1B of the semiconductor chip 1 with a center part of the rear surface 1B unshaved. In this case, a shaved part can be served as the recessed portion 1C, and an unshaved part can be served as the base 1D that has the same height (length in the Z axis direction) as those of the four corners of the rear surface 1B.

The support members 2a to 2e (sometimes collectively referred to as, simply, the "support members 2") are structures that support the semiconductor chip 1 on the diaphragm 3. The support members 2 have a columnar shape, for example, a rectangular columnar shape (for example, a square columnar shape). In addition, the support members 2 are constituted by a material that has electrical insulation. More preferably, the support members 2 are constituted by a material that has electrical insulation and a smaller thermal conductivity. As a material of the support members 2, glass (for example, borosilicate glass (Pyrex (registered trademark))) can be presented as an example.

The support members 2a to 2d as first structures each extend downward to the support surface 3B. Specifically, as illustrated in FIGS. 1 to 3, one ends of the support members 2a to 2d are each joined to a region of the support surface 3B in which the diaphragm 3 is deformed when a pressure larger than a pressure applied to the support surface 3B is applied to the pressure reception surface 3A. In addition, the other ends of the support members 2a to 2d are respectively joined to the four corners of the rear surface 1B of the semiconductor chip.

In addition, the support member 2e as a second structure extends downward to the support surface 3B. Specifically, as illustrated in FIGS. 1 to 3, one end of the support member 2e is joined to a center 30 of the diaphragm 3 on the support surface 3B in plan view. In addition, the other end of the support member 2e is joined to the center 10 of the semiconductor chip 1 in plan view. More specifically, the other end of the support member 2e is joined to the base 1D formed in the recessed portion 1C of the rear surface 1B of the semiconductor chip 1.

Note that, desirably, the support member 2e is provided on the support surface 3B of the diaphragm 3 such that the center of the bottom surface of the support member 2e and the center 30 of the diaphragm 3 coincide with each other; however, the center of the bottom surface of the support member 2e may be slightly away from the center 30 of the diaphragm 3.

The support members 2a to 2e have, for example, the same height (length in the Z axis direction). In addition, the support members 2a to 2e support the semiconductor chip 1 on the support surface 3B such that the main surface 1A of the semiconductor chip 1 and the support surface 3B of the diaphragm 3 are parallel to each other.

Next, an operational principle of the pressure sensor 100 according to the first embodiment will be described.

In the pressure sensor 100, when a pressure larger than a pressure (atmospheric pressure) applied to the support surface 3B is applied to the pressure reception surface 3A of the diaphragm 3, the diaphragm 3 is bent. At this time, the other end of the support member 2e is largely displaced in the Z axis direction but substantially not displaced in the X axis direction and the Y axis direction because the one end of the support member 2e is fixed to the center 30 of the diaphragm 3.

In contrast, the other ends of the support members 2a to 2d are tilted relative to the Z axis because the one ends of the support members 2a to 2d are fixed at positions away from the center 30 of the diaphragm 3 substantially vertically to the support surface 3B. That is, the other ends of the support members 2a to 2d are displaced not only in the Z axis direction but also in the X axis and Y axis directions. More specifically, the other ends of the support members 2a to 2d are each tilted in a direction (direction approaching the inner wall 4B of the housing 4) away from the center 30 (support member 2e) of the diaphragm 3.

Consequently, the semiconductor chip 1 is tensed outward, and a tensile stress is generated in the inner portion of the semiconductor chip 1. That is, a tensile stress according to a displacement difference in each of the X axis direction and the Y axis direction between the support member 2e and the support members 2a to 2d is generated in the inner portion of the semiconductor chip 1. Therefore, highly precise detection of the pressure of the measurement object fluid is enabled by appropriately forming resistors R1 to R4 that constitute the strain gauge (bridge circuit) mentioned above in a region of the semiconductor chip 1 in which the aforementioned tensile stress is generated.

Next, the strain gauge of the semiconductor chip 1 will be specifically described.

Figure 5:
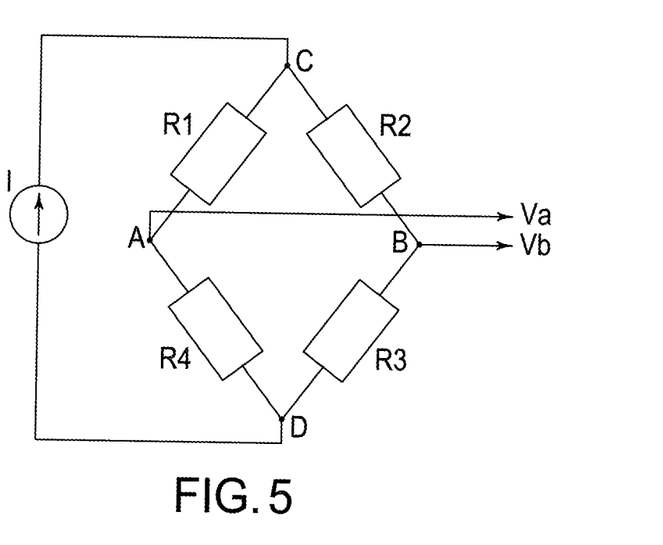
FIG. 5 illustrates a constitution of a bridge circuit as a strain gauge.

As illustrated in FIG. 5, the aforementioned strain gauge is constituted by a bridge circuit that is configured by, for example, the four resistors (for example, diffusion resistors) R1 to R4 formed on the semiconductor chip 1. The pressure sensor 100 is capable of measuring the pressure of the measurement object fluid by detecting, when a stress is generated in the inner portion of the semiconductor chip 1 in a state in which a constant current is made flow through the bridge circuit, a change in the resistance value of the resistors R1 to R4 caused by the stress.

Figure 6:
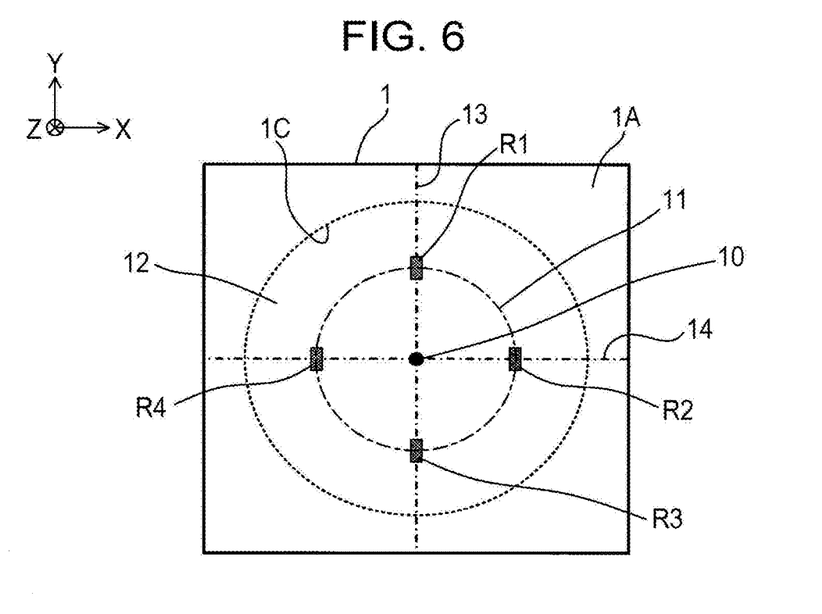
FIG. 6 illustrates an arrangement example of resistors that constitute the strain gauge on the semiconductor chip.

FIG. 6 illustrates an arrangement example of the resistors R1 to R4 on the semiconductor chip 1.

The resistors R1 to R4 are formed in a region in which when the diaphragm 3 is bent due to the pressure of the fluid, a stress generated in the semiconductor chip 1 is positive (+), that is, in a region in which a tensile stress is generated in the inner portion of the semiconductor chip 1. Specifically, the resistors R1 to R4 are formed, in a region 12 corresponding to the inside of the recessed portion 1C of the main surface 1A, on the periphery of a circle 11 that shares the center with the semiconductor chip 1. More specifically, as illustrated in FIG. 6, the resistors R1 to R4 are formed on straight lines 13 and 14 that connect the center 10 of the semiconductor chip 1 and the middle points of respective sides of the semiconductor chip 1 in plan view.

Here, the resistors R1 to R4 are required only to be formed such that at least a portion of each of the resistors R1 to R4 is on the periphery of the circle 11 and on the aforementioned straight lines.

The pressure sensor 100 that has the aforementioned structure enables suppression of variation in the shift amount of the zero point of a sensor output when the pipe in which the measurement object fluid flows and the pressure sensor 100 are connected to each other with a clamp. Hereinafter, detailed description will be provided.

Figure 7:
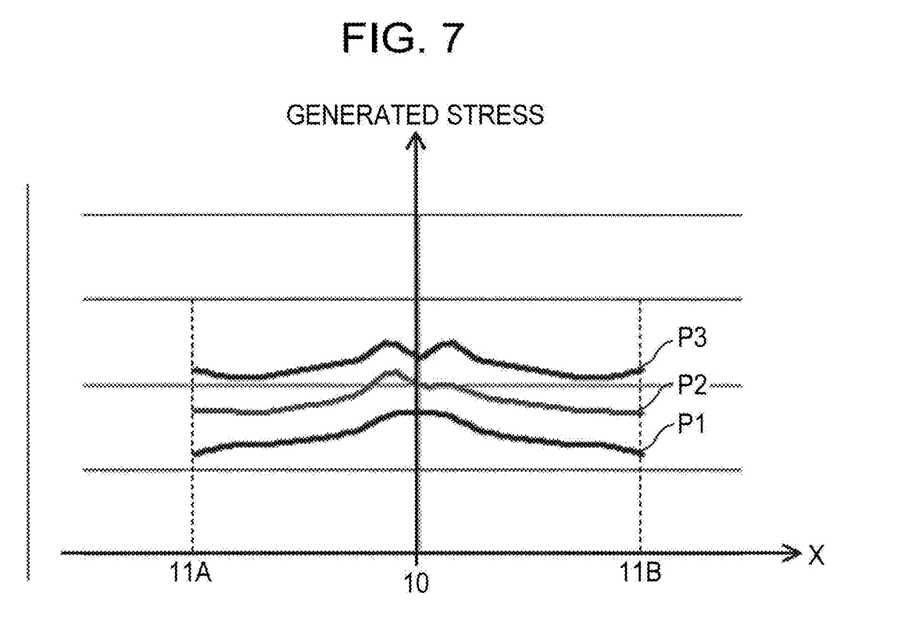
FIG. 7 shows simulation results of a stress generated in the semiconductor chip when the position of a screw with which a clamp is fixed is changed in a state in which no pressure is applied from a fluid to a pressure reception surface of a diaphragm in the pressure sensor according to the first embodiment.

FIG. 7 shows simulation results of a stress generated in the semiconductor chip when the position of a screw with which a clamp is fixed is changed in a state in which no pressure is applied from the fluid to the pressure reception surface of the diaphragm of the pressure sensor 100 according to the first embodiment. In FIG. 7, the horizontal axis indicates the position of the semiconductor chip 1 in the X axis direction with the center 30 of the diaphragm 3 as the origin point, and the vertical axis indicates the magnitude of a stress generated in the semiconductor chip 1.

FIG. 7 shows respective stress distribution of the semiconductor chip 1 when the position of the screw 52 with which the clamp 50 is fixed is changed in a state in which the pressure sensor 100 and the pipe 200 are connected to each other as illustrated in FIG. 18 with the clamp 50 illustrated in FIG. 17 and in which no pressure is applied from the fluid to the pressure reception surface 3A of the diaphragm 3.

Figure 8:
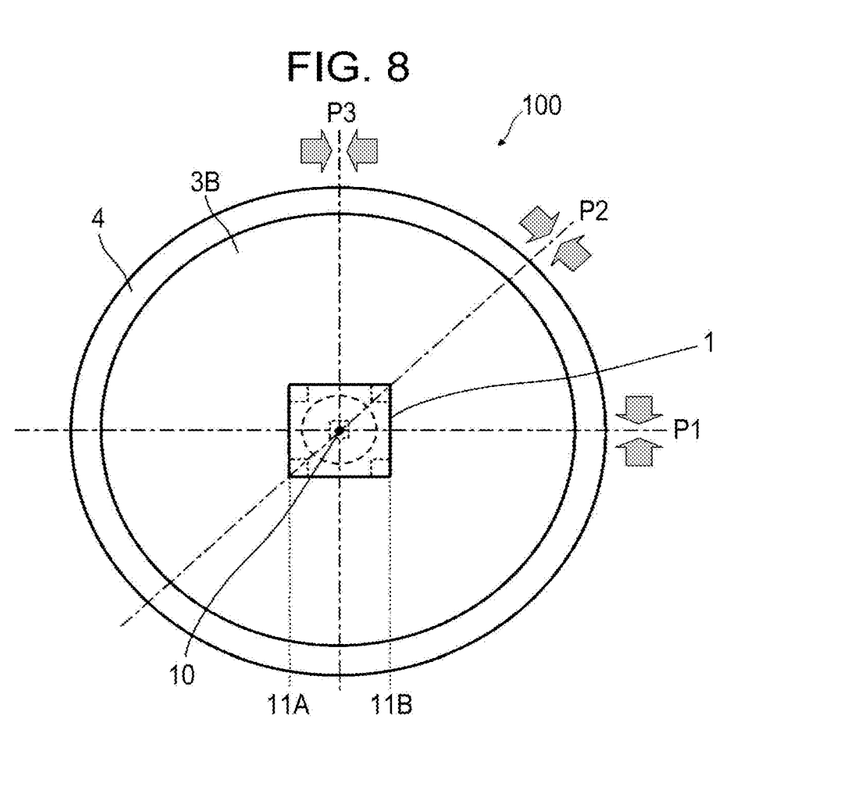
FIG. 8 illustrates a screw fixing position of the clamp that connects the pressure sensor according to the first embodiment and the pipe to each other.

In FIG. 7, the reference sign P1 indicates the stress distribution of the semiconductor chip 1 when the screw 52 of the clamp 50 is fixed at the position P1 indicated in FIG. 8, the reference sign P2 indicates the stress distribution of the semiconductor chip 1 when the screw 52 of the clamp 50 is fixed at the position P2 indicated in FIG. 8, and the reference sign P3 indicates the stress distribution of the semiconductor chip 1 when the screw 52 of the clamp 50 is fixed at the position P3 indicated in FIG. 8.

Figure 9:
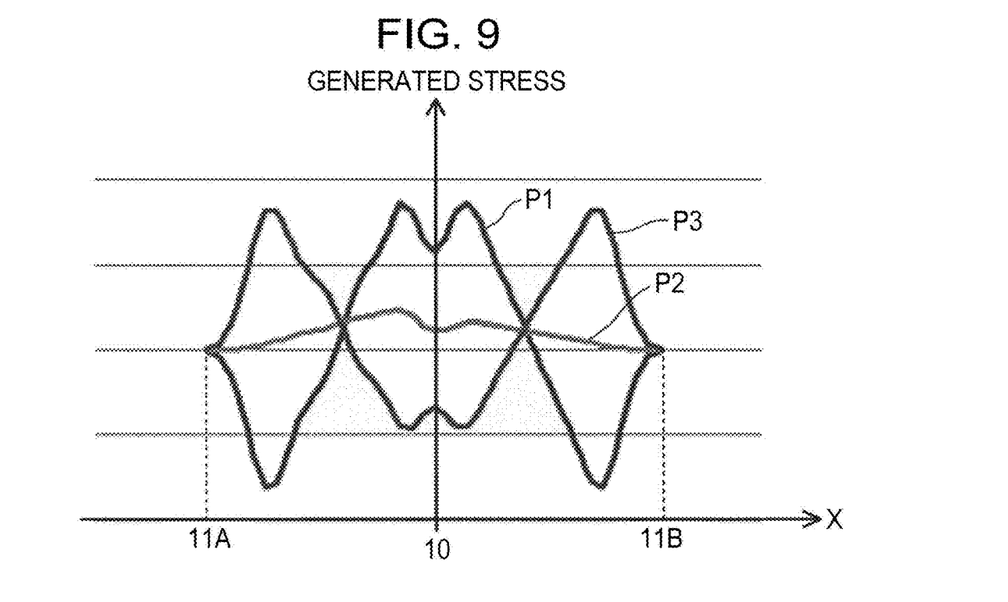
FIG. 9 shows simulation results of a stress generated in a semiconductor chip when the position of a screw with which a clamp is fixed is changed in a state in which no pressure is applied from a fluid to a pressure reception surface of a diaphragm in a pressure sensor as a comparative example.

Meanwhile, FIG. 9 shows, as a comparative example of the pressure sensor 100, simulation results of a stress generated in a semiconductor chip 1X when the position of a screw with which a clamp is fixed is changed in a state in which no pressure is applied from a fluid to a pressure reception surface of a diaphragm in a pressure sensor 301 in which the semiconductor chip 1X that has an oblong shape in plan view is disposed in the vicinity of the center 30 of the support surface 3B of the diaphragm 3. In FIG. 9, the horizontal axis indicates the position of the semiconductor chip 1X in the X axis direction with the center 30 of the diaphragm 3 as the origin point, and the vertical axis indicates the magnitude of a stress generated in the semiconductor chip 1X.

Figure 10:
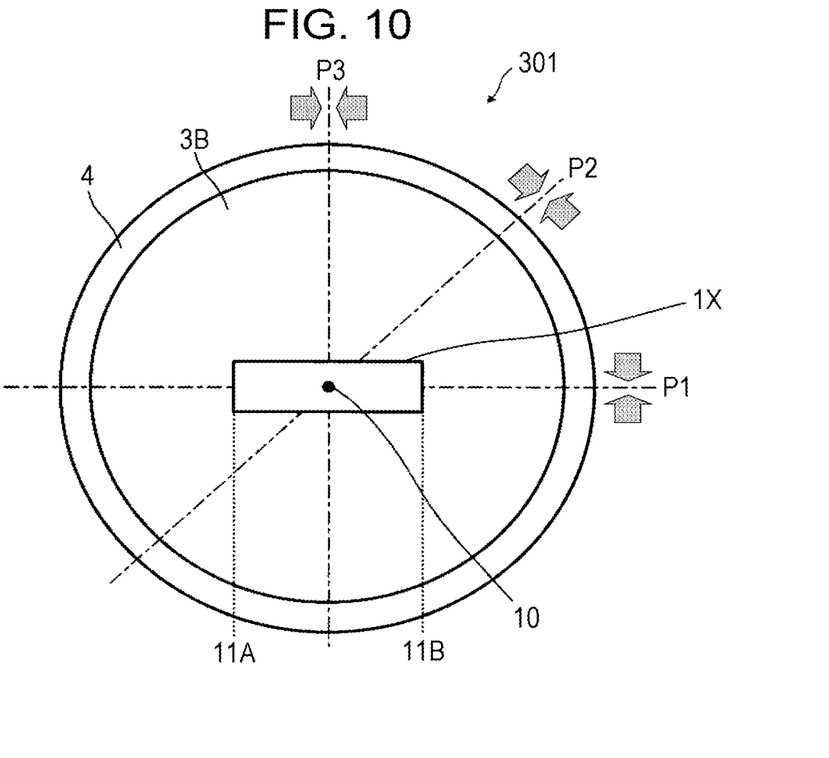
FIG. 10 illustrates a screw fixing position of the clamp that connects the pressure sensor as the comparative example and a pipe to each other.

FIG. 9 shows respective stress distribution of the semiconductor chip 1 when the position of the screw 52 with which the clamp 50 is fixed is changed in a state in which the pressure sensor 301 and the pipe 200 are connected to each other as illustrated in FIG. 18 with the clamp 50 illustrated in FIG. 17 and in which no pressure is applied from the fluid to the pressure reception surface 3A of the diaphragm 3. In FIG. 9, the reference sign P1 indicates the stress distribution of the semiconductor chip 1X when the screw 52 of the clamp 50 is fixed at the position P1 indicated in FIG. 10. The reference sign P2 indicates the stress distribution of the semiconductor chip 1X when the screw 52 of the clamp 50 is fixed at the position P2 indicated in FIG. 10. The reference sign P3 indicates the stress distribution of the semiconductor chip 1X when the screw 52 of the clamp 50 is fixed at the position P3 indicated in FIG. 10.

First, it is understood that in the case of the pressure sensor 301 provided with the oblong semiconductor chip 1X, as shown in FIG. 9, the tendency of the stress distribution greatly changes depending on the fastening position of the screw 52 of the clamp 50. As a result, the shift amount of the zero point of the sensor output of the pressure sensor 301 greatly varies depending on the position of the screw 52, and thus, when the pressure sensor 301 is used, it is required to determine an optimal position at which the clamp 50 is fastened with the screw 52.

In contrast, in the case of the pressure sensor 100 according to the first embodiment, as shown in FIG. 7, the tendency of the stress distribution substantially do not change depending on the fastening position of the screw 52 of the clamp 50.

In addition, variation in the absolute value of a generated stress is small compared with the pressure sensor 301 of the aforementioned comparative example. Therefore, the pressure sensor 100 according to the first embodiment is capable of reducing variation in the shift amount of the zero point of the sensor output due to the fastening position of the screw 52 of the clamp 50 compared with the conventional pressure sensor that has the oblong semiconductor chip.

Thus, the pressure sensor 100 according to the first embodiment has a structure in which the semiconductor chip has a square shape in plan view and in which at the center of the support surface 3B of the diaphragm 3, the center 10 and the four corners of the semiconductor chip 1 are respectively supported by the support members 2a to 2e. According to the structure, it becomes possible to suppress variation in a generated stress of the semiconductor chip 1 depending on the fastening position of the screw 52 of the clamp 50, which is for connecting the pressure sensor 100 and the pipe 200 to each other, by forming the resistors R1 to R4 that constitute the strain gauge at an appropriate position in the semiconductor chip 1. For example, it is possible to effectively suppress the aforementioned variation by forming each of the resistors R1 to R4 on the periphery of the circle 11 that shares the center with the semiconductor chip 1 in plan view.

Consequently, compared with the conventional pressure sensor that has the oblong semiconductor chip, it becomes possible to reduce the variation in the shift amount of the zero point of the sensor output due to the fastening position of the screw 52 of the clamp 50.

In particular, it is possible to effectively reduce the variation in a generated stress of the semiconductor chip 1 depending on the fastening position of the screw 52 by forming each of the resistors R1 to R4 on the straight lines that connect the center 10 of the semiconductor chip 1 and the middle points of respective sides of the semiconductor chip 1 in plan view. Consequently, it becomes possible to further reduce the variation in the shift amount of the zero point of the sensor output.

In addition, it is possible to further improve the sensor sensitivity of the pressure sensor 100 with respect to a pressure applied to the pressure reception surface 3A of the diaphragm 3 by providing the recessed portion 1C in the rear surface 1B of the semiconductor chip 1 and forming the resistors R1 to R4 in the region inside the recessed portion 1C in plan view.

Second Embodiment

Figure 11:
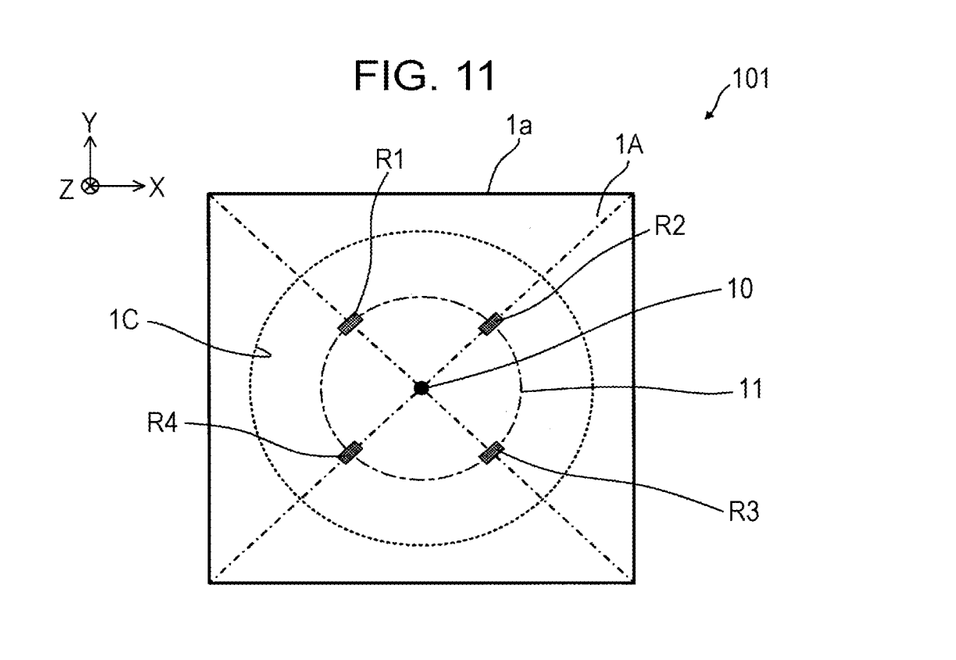
FIG. 11 is a plan view illustrating a constitution of a pressure sensor according to a second embodiment.

FIG. 11 illustrates a constitution of a pressure sensor according to a second embodiment.

Similarly to FIG. 2, FIG. 11 illustrates a planar structure of a pressure sensor 101 according to the second embodiment. Note that, in FIG. 11, illustration of the diaphragm 3 and the housing 4 is omitted.

The pressure sensor 101 according to the second embodiment are different from the pressure sensor 100 according to the first embodiment in that the positions at which the resistors R1 to R4 that constitute the strain gauge are formed are different and are the same as the pressure sensor according to the first embodiment in other points.

As illustrated in FIG. 11, the resistors R1 to R4 that constitute the strain gauge are formed, on a semiconductor chip 1a, on diagonal lines of the semiconductor chip 1a in plan view. Specifically, the resistors R1 to R4 are formed on straight lines respectively connect the center 10 of the semiconductor chip 1a and the four corners of the semiconductor chip in plan view.

Here, the resistors R1 to R4 are required only to be formed such that at least a portion of each of the resistors R1 to R4 is on the aforementioned straight lines.

Figure 12:
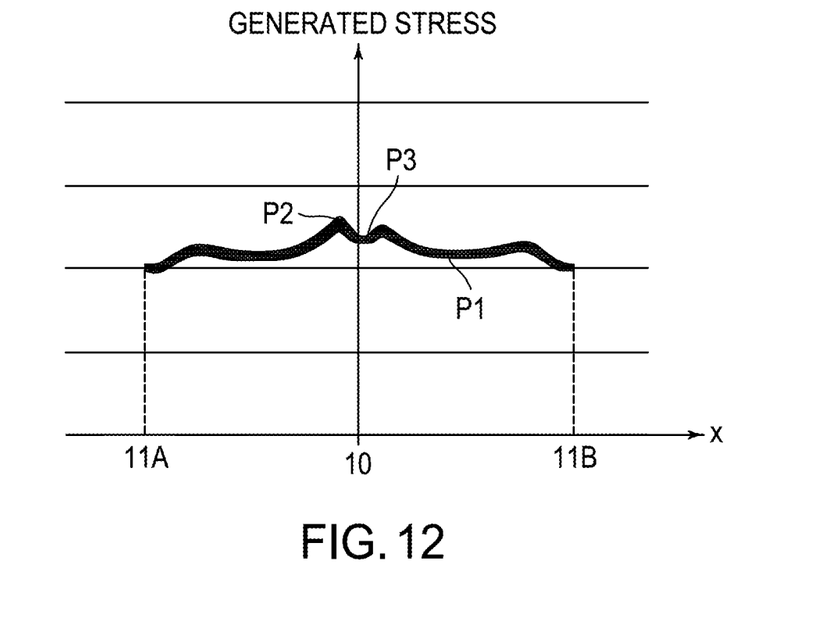
FIG. 12 shows simulation results of a stress generated in a semiconductor chip when the position of a screw with which a clamp is fixed is changed in a state in which no pressure is applied from a fluid to a pressure reception surface of a diaphragm in the pressure sensor according to the second embodiment.

FIG. 12 is simulation results of a stress generated in the semiconductor chip 1a when the position of a screw with which the clamp is fixed is changed in a state in which no pressure is applied from the fluid to the pressure reception surface of the diaphragm of the pressure sensor 101 according to the second embodiment. In FIG. 12, the horizontal axis indicates the position of the semiconductor chip 1a in the directions of the diagonal lines (directions of the straight lines that connect the center 10 and the four corners of the semiconductor chip 1a) with the center 30 of the diaphragm 3 as the origin point, and the vertical axis indicates the magnitude of a stress generated in the semiconductor chip 1a.

In addition, in FIG. 12, similarly to FIG. 8, the reference sings P1 to P3 each indicate stress distribution of the semiconductor chip 1a when the screw 52 of the clamp 50 is fixed at each of the positions P1 to P3 in a state in which no pressure is applied from the fluid to the pressure reception surface 3A of the diaphragm 3.

In the pressure sensor 101 according to the second embodiment, as shown in FIG. 12, the tendency of the stress distribution and the absolute value of the stress are substantially constant regardless of the fastening position of the screw 52 of the clamp 50. Therefore, the pressure sensor 101 according to the second embodiment is capable of further reducing the variation in the shift amount of the zero point of the sensor output due to the fastening position of the screw 52 of the clamp 50 compared with the conventional pressure sensor that has the oblong semiconductor chip.

Third Embodiment

Figure 13:
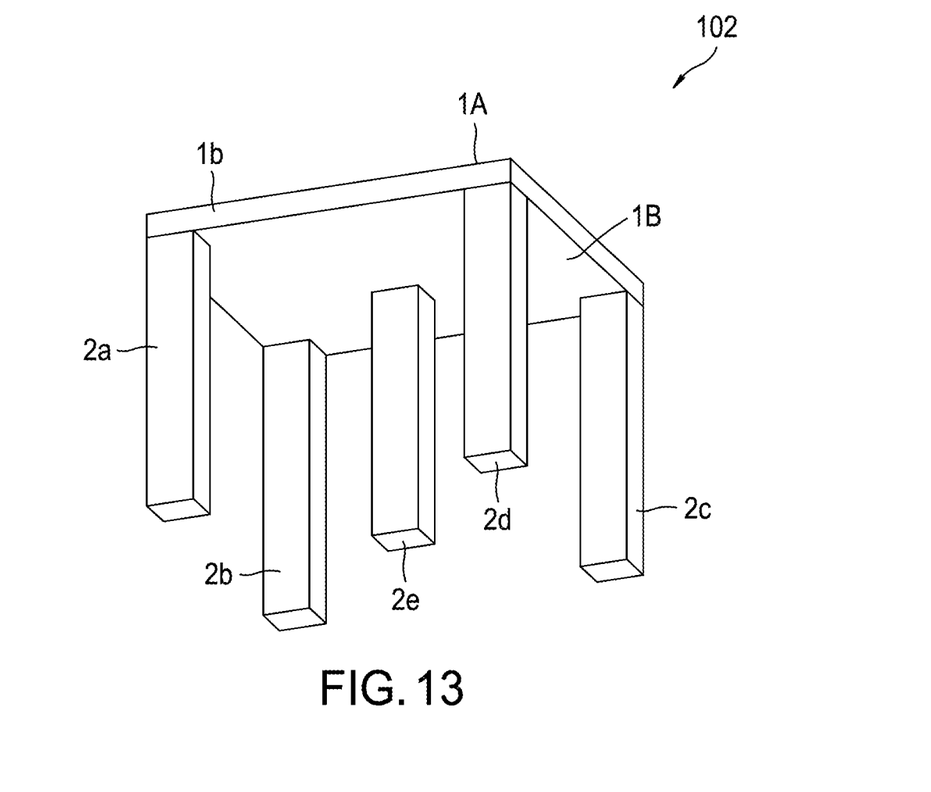
FIG. 13 is a perspective view illustrating a constitution of a pressure sensor according to a third embodiment.
Figure 14:
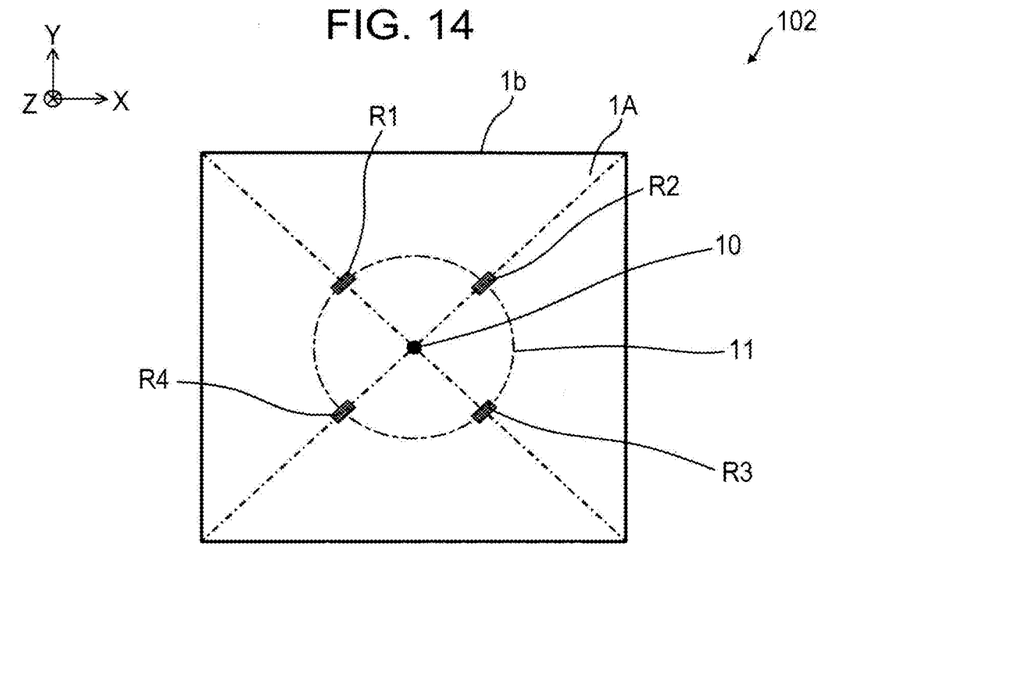
FIG. 14 is a plan view illustrating the constitution of the pressure sensor according to the third embodiment.

FIGS. 13 and 14 illustrate a constitution of a pressure sensor according to a third embodiment.

FIG. 13 illustrates a perspective view of a pressure sensor 102 according to the third embodiment. FIG. 14 illustrates a planar structure of the pressure sensor 102 according to the third embodiment viewed in the Z direction. Note that, in FIGS. 13 and 14, illustration of the diaphragm 3 and the housing 4 is omitted.

The pressure sensor 102 according to the third embodiment is different from the pressure sensor 101 according to the second embodiment in that the recessed portion 1C is not formed on the rear surface 1B of a semiconductor chip 1b and is the same as the pressure sensor 101 according to the second embodiment in other points.

As illustrated in FIG. 13, the semiconductor chip 1b of the pressure sensor 102 does not have the recessed portion 1C and has the rear surface 1B that is a flat surface. In addition, as illustrated in FIG. 14, the resistors R1 to R4 that constitute the strain gauge of the pressure sensor 102 are formed, similarly to the pressure sensor 101 according to the second embodiment, on straight lines that respectively connect the center 10 of the semiconductor chip 1b and the four corner of the semiconductor chip 1b in plan view.

Figure 15:
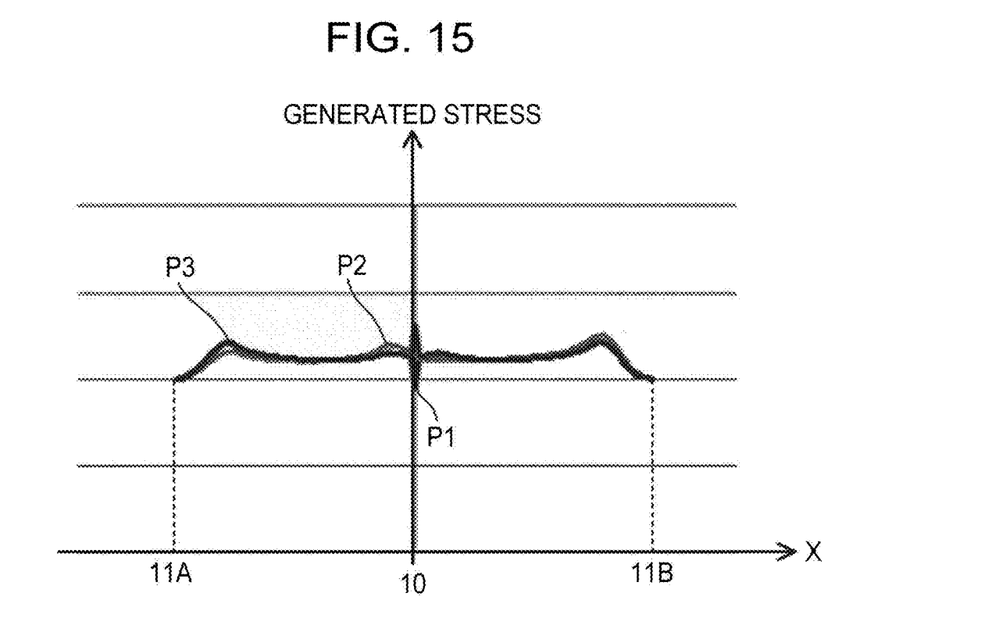
FIG. 15 shows simulation results of a stress generated in a semiconductor chip when the position of a screw with which a clamp is fixed is changed in a state in which no pressure is applied from a fluid to a pressure reception surface of a diaphragm in the pressure sensor according to the third embodiment.

FIG. 15 is simulation results of a stress generated in the semiconductor chip 1b when the position of a screw with which a clamp is fixed is changed in a state in which no pressure is applied from a fluid to a pressure reception surface of the diaphragm of the pressure sensor 102 according to the third embodiment. In FIG. 15, the horizontal axis indicates the position of the semiconductor chip 1b in the directions of the diagonal lines (directions of the straight lines that connect the center 10 and the four corners of the semiconductor chip 1b) with the center 30 of the diaphragm 3 as the origin point, and the vertical axis indicates the magnitude of a stress generated in the semiconductor chip 1b.

In addition, in FIG. 15, similarly to FIG. 9, the reference signs P1 to P3 indicate respective stress distribution of the semiconductor chip 1b when the screw 52 of the clamp 50 is fixed at each of the positions P1 to P3 in a state in which no pressure is applied from the fluid to the pressure reception surface 3A of the diaphragm 3.

In the pressure sensor 102 according to the third embodiment, as shown in FIG. 15, the tendency of the stress distribution and the absolute value of the stress are substantially constant regardless of the fastening position of the screw 52 of the clamp 50. Therefore, similarly to the pressure sensor 101 according to the second embodiment that has the recessed portion 1C, the pressure sensor 102 according to the third embodiment is capable of significantly reducing the variation in the shift amount of the zero point of the sensor output due to the fastening position of the screw 52 of the clamp 50.

In the foregoing, the invention made by the inventors has been specifically described on the basis of the embodiments; however, the present invention should not be limited thereto, and there is no need to say that the present invention can be variously modified within a scope that is not deviated from the concept of the invention.

Figure 16:
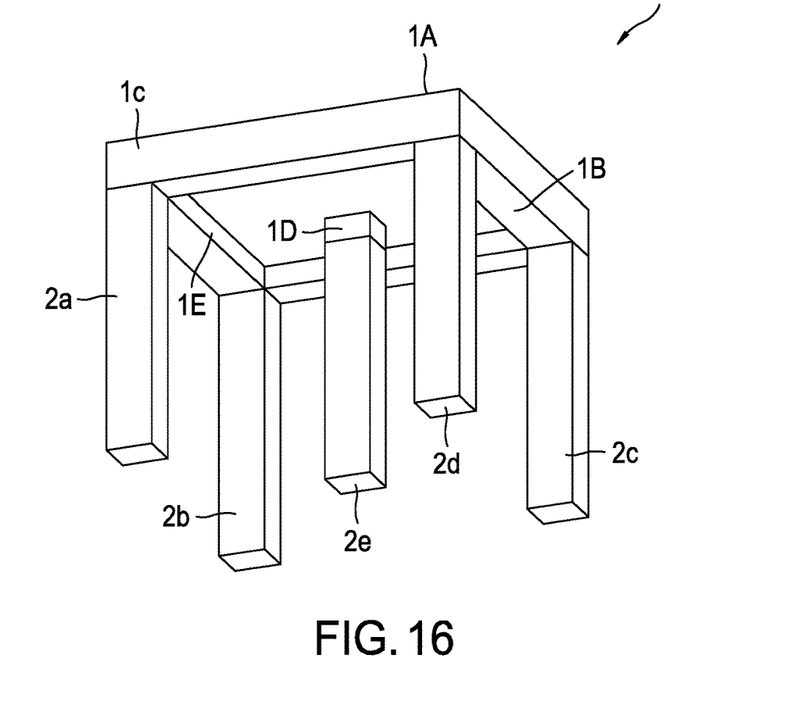
FIG. 16 is a perspective view illustrating another shape of a recessed portion formed in the semiconductor chip.

For example, in each of the first and second embodiments, a case in which the recessed portion 1C formed in the rear surface 1B of the semiconductor chip 1, 1a has a circular shape in plan view is presented as an example; however, the shape of the recessed portion 1C in plan view is not particularly limited. For example, as is in a pressure sensor 103 illustrated in FIG. 16, a recessed portion 1E that has a rectangular shape in plan view may be formed.

In addition, in each of the first and second embodiments, a case in which the support member 2e is joined to the semiconductor chip 1, 1a via the base 1D is presented as an example; however, the case is a non-limiting example. For example, the support member 2e may be directly joined to the center 10 of the rear surface of the semiconductor chip 1, 1a without providing the base 1D. In this case, the length of the support member 2e in the Z axis direction is required to be longer than the lengths of the support members 2a to 2d in the Z axis direction so that the main surface 1A of the semiconductor chip 1 and the support surface 3B of the diaphragm 3 are parallel to each other when the semiconductor chip 1 is fixed on the diaphragm 3.

In addition, in the aforementioned embodiments, a case in which each of the support members 2a to 2e and the base 1D has a rectangular columnar shape is presented as an example; however, each of the support members 2a to 2e and the base 1D may have, for example, a circular columnar shape.

In addition, in the aforementioned embodiments, a case in which the resistors R1 to R4 are disposed on the periphery of the circle 11 that has the center shared with the semiconductor chip 1 is presented as an arrangement example of the resistors R1 to R4 that constitute the strain gauge; however, the case is a non-limiting example. That is, the resistors R1 to R4 are required only to be formed at positions in which the variation in the generated stress of the semiconductor chip 1 depending on the fastening position of the screw 52 is small; the resistors R1 to R4 are not necessarily formed on the aforementioned periphery.

For example, in FIG. 6, the resistors R1 to R4 are required only to be formed on the straight line 13 or the straight line 14, and the respective distances from the center 10 to each of the resistors R1 to R4 may not coincide with each other.

Specifically, the resistors R1 to R4 may be formed on one straight line of the straight line 13 or the straight line 14. Consequently, compared with a case in which the semiconductor chip 1 has conventionally an oblong shape in plan view, it is possible to reduce the variation in the shift amount of the zero point of the sensor output due to the fastening position of the screw 52 of the clamp 50.

In addition, in the aforementioned embodiments, the length of the diameter of the circle 11 is not limited to the length indicated in FIG. 6, and there is not need to say that the length of the diameter of the circle 11 can be changed according to required performance and the like.

INDUSTRIAL APPLICABILITY

The pressure sensor according to the present invention is applicable to various applications, for example, a sanitary pressure sensor and the like.

REFERENCE SIGNS LIST 100, 101, 102, 103 PRESSURE SENSOR
1, 1a, 1b SEMICONDUCTOR CHIP
1A MAIN SURFACE OF SEMICONDUCTOR CHIP
1B REAR SURFACE OF SEMICONDUCTOR CHIP
1C RECESSED PORTION
1D, 1E BASE
10 CENTER OF SEMICONDUCTOR CHIP
2a, 2b, 2c, 2d, 2e SUPPORT MEMBER
3 DIAPHRAGM
3A PRESSURE RECEPTION SURFACE
3B SUPPORT SURFACE
30 CENTER OF DIAPHRAGM
4 HOUSING
4A END PORTION OF HOUSING
4B INNER WALL OF HOUSING
R1-R4 RESISTOR

The invention claimed is:

1. A pressure sensor comprising:
a diaphragm that has a first main surface that receives a pressure of a measurement object fluid and a second main surface opposite to the first main surface;
a semiconductor chip that has one surface on which a plurality of resistors that constitute a strain gauge are formed, the semiconductor chip having a square shape in plan view;
four first structures that each have one end joined in a region of the second main surface in which the diaphragm is deformed when a pressure larger than a pressure applied to the second main surface is applied to the first main surface and that have other ends respectively connected to four corners of an other surface of the semiconductor chip, the four first structures extending downward to the second main surface; and
a second structure that has one end joined to a center of the diaphragm on the second main surface in plan view and that has an other end joined to a center of the other surface of the semiconductor chip in plan view, the second structure extending downward to the second main surface, wherein the plurality of resistors are formed on a periphery of a circle that shares a center with the semiconductor chip in plan view, and wherein the plurality of resistors are formed on straight lines that connect the center of the semiconductor chip and middle points of respective sides of the semiconductor chip to each other in plan view.

2. The pressure sensor according to claim 1, wherein the semiconductor chip has a recessed portion that is formed in the other surface, and wherein the plurality of resistors are formed, on the one surface of the semiconductor chip, in a region corresponding to an inside of the recessed portion.

3. The pressure sensor according to claim 2, wherein the recessed portion has a circular shape in plan view.

4. The pressure sensor according to claim 2, wherein the recessed portion has a rectangular shape in plan view.

5. The pressure sensor of claim 2, wherein the other end of the second structure is joined to a center of the recessed portion.

\* \* \* \* \*